United States Patent Office 3,161,419
Patented Dec. 15, 1964

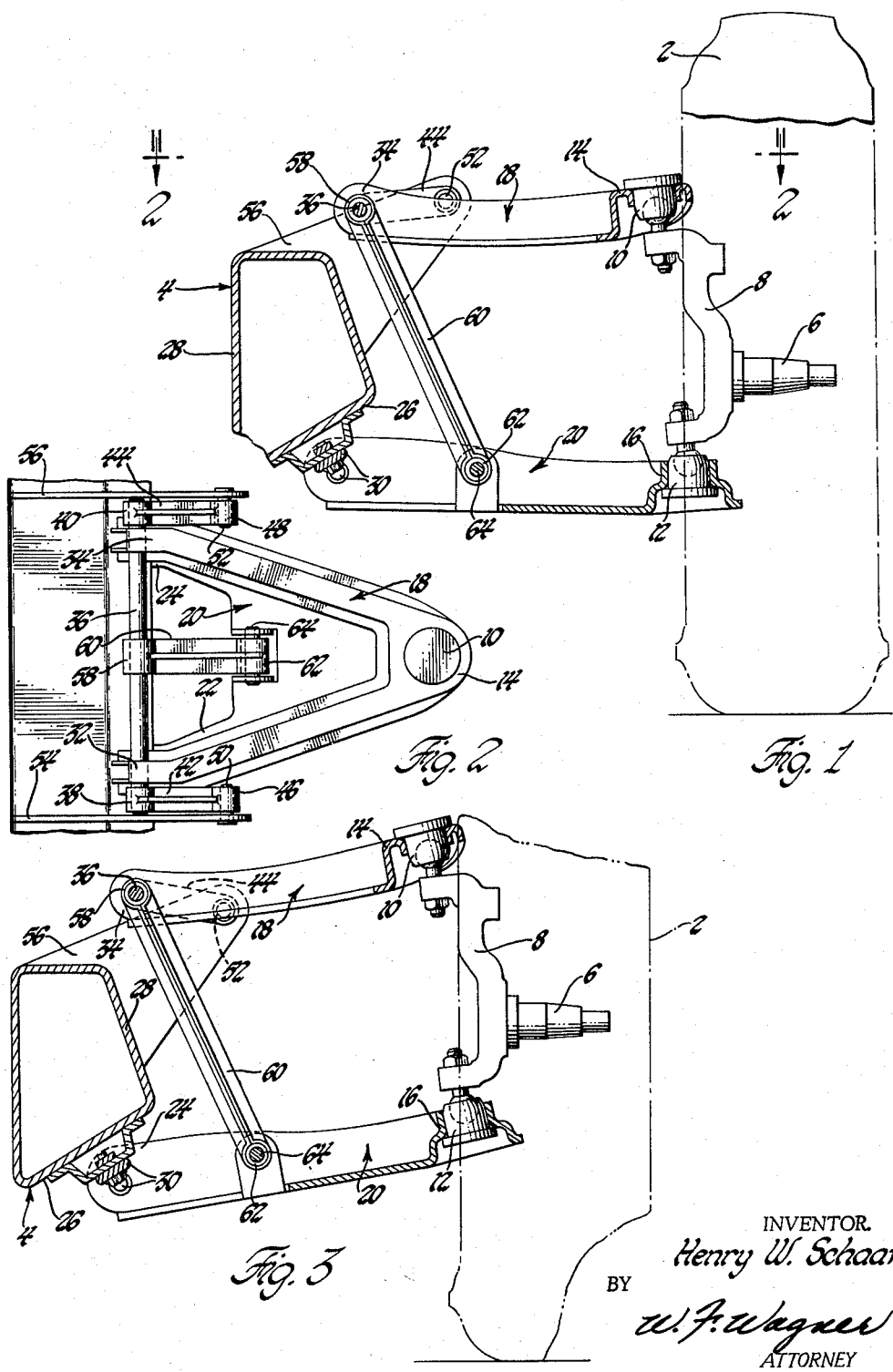

3,161,419
INDEPENDENT WHEEL SUSPENSION LINKAGE
Henry W. Schaaf, Ortonville, Mich., assignor to General Motors Corporation, Detroit, Mich., a corporation of Delaware
Filed Dec. 19, 1962, Ser. No. 245,910
6 Claims. (Cl. 280—96.1)

This invention relates to vehicle suspension and more particularly to independent wheel suspension linkage of the parallel wishbone type.

An object of the invention is to provide an improved independent wheel suspension linkage.

Another object is to provide an independent wheel suspension linkage providing reduced camber change without accompanying reduction in tread width during wheel deflection.

A further object is to provide a parallel wishbone type independent wheel suspension linkage in which one of the wishbone members is mounted in a manner providing an effective length considerably in excess of its actual length.

Still a further object is to provide a linkage of the type described wherein the outer end of one link moves through an arc during wheel deflection and the outer end of the other link moves through a path approximating the chord of an arc generated from a point substantially inboard of the inner extremity thereof.

Yet a further object is to provide an arrangement of the stated character wherein the inner end of one arm is indirectly connected to the vehicle frame and to the other arm.

These and other objects, features and advantages of the invention will become more fully apparent as reference is had to the accompanying specification and drawings wherein:

FIGURE 1 is a fragmentary front elevational view, partly in section, illustrating a suspension linkage for one dirigible wheel of a vehicle in accordance with the invention, the various elements of the linkage being shown in their relative positions when the vehicle is at normal standing height;

FIGURE 2 is a fragmentary top plan view of the structure shown in FIGURE 1; and

FIGURE 3 is a view similar to FIGURE 1, illustrating the relationship of the elements when the vehicle wheel is in an upwardly deflected position with respect to the vehicle frame.

Referring now to the drawings and particularly FIGURES 1 and 2, there is shown an independent wheel suspension linkage for one wheel 2 of the usual pair of dirigible wheels at the forward end of a vehicle 4. It will be understood that the linkage arrangement shown is duplicated at the opposite side of the vehicle and accordingly the following description applies equally to both sides of the vehicle. Wheel 2 is rotatably mounted on the spindle portion 6 of a vertically extending wheel knuckle support 8. The opposite ends of knuckle 8 are pivotally connected by ball joint assemblies 10 and 12 to the outer ends 14 and 16, respectively, of a pair of vertically spaced generally parallel transversely extending wishbone type control arms 18 and 20. The longitudinally spaced inboard ends 22 and 24 of lower arm 20 are pivotally connected to the lower surface 26 of a frame side rail 28 in a conventional manner by means of a longitudinally extending pivot shaft 30. The longitudinally spaced inboard ends 32 and 34 of upper arm 18 are journalled on a longitudinally extending shaft 36, the opposite ends of which extend beyond ends 32 and 34 and are secured in the inner ends 38 and 40 of a pair of links 42 and 44. The outer ends 46 and 48 of links 42 and 44 in turn are pivotally secured on fixed longitudinally aligned journal pins 50 and 52 rigidly fixed on outrigger brackets 54 and 56 secured to frame side rail 28. Midway of its length, shaft 36 is surrounded by the upper end 58 of a generally vertically extending link 60. The lower end 62 of link 60 in turn is pivotally secured by pin joint 64 to control arm 20 intermediate the inner and outer end thereof.

When arranged in the manner described, the linkage construction enables vertical deflection of wheel 2 with substantially no change in wheel camber angle. Operation of the linkage is as follows. Upon upward deflection of the wheel from the position shown in FIGURE 1, lower control arm 20 travels in an arc generated about the fixed longitudinal axis of pivot shaft 30. Accordingly, the ball joint 12 at the outer end of arm 20 describes an arc which moves progressively inwardly and upwardly. Simultaneously, pin joint 64 moves upwardly through an arc also generated from the axis of shaft 30 causing the link 60 to rise progressively. As the upper end of link 60 rises, shaft 36 is caused to swing upwardly about an arc generated from the fixed axis of journal pins 50 and 52, while the outer end of upper control arm 18 moves in an arcuate path about the axis of shaft 36. Since shaft 36 does not occupy a fixed vertical level relative to pivot shaft 30, the path of ball joint 10 relative to frame 28 is in approximation of the chord of an arc considerably greater in length than the true arc generated about the axis of shaft 36. Hence, while the outer end of the lower control arm is moving progressively upwardly and inwardly, the outer end of the upper control arm is moving vertically in approximately a straight line. As a result, the camber inclination of the wheel varies only slightly, if at all, from the inclination under normal vehicle load. Variations, of course, are dependent upon the location of the connection of link 60 with control arm 20, the length and initial inclination of links 42 and 44 and the relative lengths of arms 18 and 20.

In practice, the described construction makes it possible to provide a parallel wishbone type suspension having minimal camber change during wheel deflection without the accompanying pronounced decrease in tread width typical of prior art constructions. It is, of course, apparent that the classic form of parallel linkage suspension in which both the upper and lower control arms are of equal lengths will necessarily maintain uniform camber angle irrespective of wheel deflection. However, in this form of linkage, the location of the inboard pivot shaft for both the upper and lower arms is determined by the space available for the upper pivot shaft. Because of the space occupied by the engine, both pivot shafts must be located relatively near the vertical plane of the wheel. Both control arms are, therefore, relatively short. In consequence, moderate wheel deflection causes pronounced inward translation of the wheel at each side of the vehicle. The resulting severe reduction in tread width, of course, produces undesirable tire scrub. However, in the present invention, the space limitation imposed by the engine is eliminated, since the lower control arm may be of conventional length, i.e., extending inwardly relatively close to the vehicle longitudinal centerline, while the upper link thereof, although considerably shorter and disposed entirely outboard of the frame side rail, simulates the results produced by an arm equal in length to the lower control arm.

It will be understood that a conventional spring (not shown) will be positioned between the frame and lower control arm 20 in order to provide elastic support of the former relative to wheel 2.

While but one embodiment of the invention has been shown and described, it will be apparent that other changes and modifications may be made therein. It is, therefore, to be understood that it is not intended to limit the invention to the embodiment shown, but only by the scope of the claims which follow.

I claim:

1. Independent wheel suspension linkage for a vehicle comprising, a pair of vertically spaced transversely extending control arms, a wheel knuckle extending between and pivotally connected to the outer ends of said arms, the lower of said arms being mounted on a longitudinally extending pivot shaft fixed relative to said vehicle and the inner end of the upper of said arms being mounted on a longitudinally extending pivot shaft pivotally mounted on said vehicle for swinging movement through an arcuate path, and a link connected at one end to the movable shaft and at the other end to said lower arm between the fixed pivot shaft and the outer end of said arm, said link operating to arcuately displace said movable shaft in a predetermined ratio to swinging movement of said lower arm.

2. Independent wheel suspension linkage for a vehicle comprising, a pair of vertically spaced transversely extending control arms, a wheel knuckle extending between and pivotally connected to the outer ends of said arms, the lower of said arms being mounted on a longitudinally extending pivot shaft fixed relative to said vehicle and the inner end of the upper of said arms being mounted on a longitudinally extending pivot shaft pivotally mounted on said vehicle for vertical swinging movement through an arcuate path, and a link connected at one end to the movable shaft and at the other end to said lower arm between the fixed pivot shaft and the outer end of said arm, said link operating to arcuately displace said movable shaft in a predetermined ratio to swinging movement of said lower arm.

3. Independent wheel suspension linkage for a vehicle comprising, upper and lower transversely extending control arms arranged in vertically spaced relation, a wheel supporting knuckle extending between and pivotally connected at its opposite ends to the outer ends of said arms, a generally horizontal longitudinally extending first pivot shaft fixed relative to said vehicle, means pivotally mounting the inboard end of said lower arm to said first shaft, a generally horizontal longitudinally extending second pivot shaft mounted on said vehicle for swinging movement in a plane normal to the axis of said shaft, means pivotally mounting the inboard end of said upper arm on said second shaft, and a link connected at one end to said second shaft and at the other end to said lower arm outboard of said first pivot shaft operative to displace said second shaft upon swinging movement of said lower arm.

4. Independent wheel suspension linkage for a vehicle comprising, upper and lower transversely extending control arms arranged in vertically spaced relation, a wheel supporting knuckle extending between and pivotally connected at its opposite ends to the outer ends of said arms, a generally horizontal longitudinally extending first pivot shaft rigidly secured to said vehicle, means pivotally mounting the inboard end of said lower arm to said first shaft, a pair of longitudinally spaced links each pivotally secured at one end to said vehicle on a common axis, a generally horizontal longitudinally extending second pivot shaft extending between and secured to the other end of each link for swinging movement about said common axis, means pivotally mounting the inboard end of said upper arm on said second shaft, and a link pivotally connected at one end to said second shaft and at the other end to said lower arm outboard of said first pivot shaft operative to displace said second shaft in an arc about said common axis upon swinging movement of said lower arm.

5. The structure set forth in claim 4 wherein said common axis is disposed outboard of said second shaft.

6. The structure set forth in claim 5 wherein said links are inclined downwardly from said common axis when said control arms are in normal position.

References Cited in the file of this patent

UNITED STATES PATENTS

| | | |
|---|---|---|
| 2,094,582 | Chapman | Oct. 5, 1937 |
| 2,866,651 | Powell | Dec. 30, 1958 |
| 3,033,586 | Rosenkrands | May 8, 1962 |
| 3,075,787 | Mineck | Jan. 29, 1963 |